United States Patent [19]

Aspinwall et al.

[11] 3,753,183
[45] Aug. 14, 1973

[54] METHOD OF FORMING A MAGNETIZED HELICAL COIL

[75] Inventors: Ronald A. Aspinwall, Detroit; MacKellar K. Graham, Birmingham, both of Mich.

[73] Assignee: Sperry Rand Corporation, Troy, Mich.

[22] Filed: June 21, 1972

[21] Appl. No.: 264,823

Related U.S. Application Data

[63] Continuation of Ser. No. 59,773, June 23, 1970, abandoned, which is a continuation of Ser. No. 855,693, Sept. 5, 1969, Pat. No. 3,598,237.

[52] U.S. Cl. .................................. 335/284, 335/305
[51] Int. Cl. ............................................. H01f 13/00
[58] Field of Search ........................... 210/222, 223; 335/284, 302, 305

[56] References Cited

UNITED STATES PATENTS

| | | | |
|---|---|---|---|
| 2,690,842 | 10/1954 | Spluvak | 210/222 X |
| 3,139,567 | 6/1964 | Atkinson | 335/284 |
| 3,136,720 | 6/1964 | Bagermann | 210/222 |

*Primary Examiner*—George Harris
*Attorney*—Arthur Raisch, John M. Kisselle et al.

[57] ABSTRACT

A filter including a cylindrical filter element which is arranged to normally have fluid pass therethrough. A bypass valve is provided to bypass fluid directly to the outlet when the pressure at the inlet becomes excessive. A magnetized helical coil is provided adjacent the filter element to attract metal particles.

3 Claims, 5 Drawing Figures

PATENTED AUG 14 1973 3,753,183

INVENTORS
RONALD A. ASPINWALL
MACKELLAR K. GRAHAM

Barnes, Kisselle, Raisch & Choate
ATTORNEYS

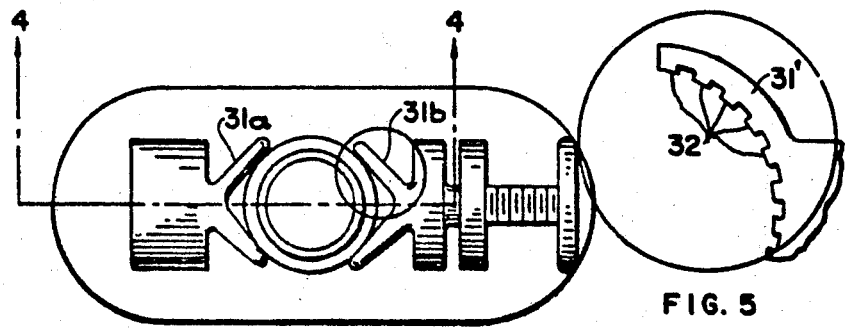
FIG. 3
FIG. 5
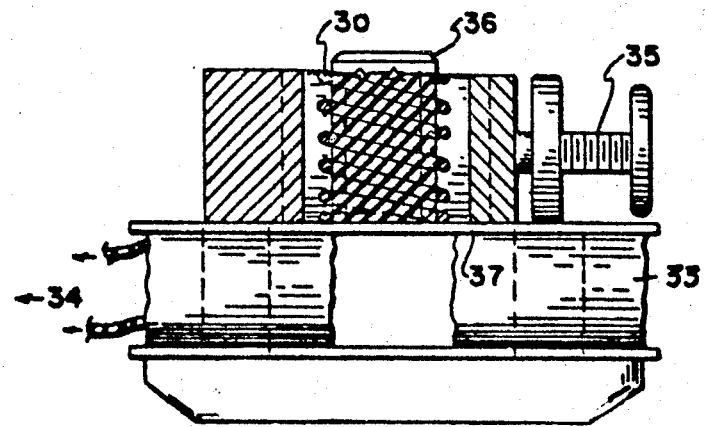
FIG. 4

METHOD OF FORMING A MAGNETIZED HELICAL COIL

This Application is a continuation of Ser. No. 59,773 filed June 23, 1970, now abandoned; which is a continuation of Ser. No. 855,693 filed Sept. 5, 1969, now U.S. Pat. No. 3,598,237.

This invention relates to fluid filters.

BACKGROUND OF THE INVENTION

In fluid filters that are utilized for filtering hydraulic fluids and the like, it is desirable to provide some means to attract metal particles and remove them from the hydraulic system.

Among the objects of the invention are to provide a filter having a novel means for removing metal particles from the fluid and to provide a novel method of forming the same.

SUMMARY OF THE INVENTION

A filter including a cylindrical filter element which is arranged to normally have fluid pass therethrough. A linear bypass valve is provided to bypass fluid directly to the outlet when the pressure at the inlet becomes excessive. A magnetized coil is provided adjacent the filter element to attract metal particles.

DESCRIPTION OF THE DRAWINGS

FIG. 3 is a top plan view of an apparatus for magnetizing a part of the filter.

FIG. 4 is a sectional view taken along the line 4—4 in FIG. 3.

FIG. 5 is a fragmentary plan view on an enlarged scale of a portion of a modified form of apparatus for magnetizing a part of the filter.

DESCRIPTION

Figure 1:
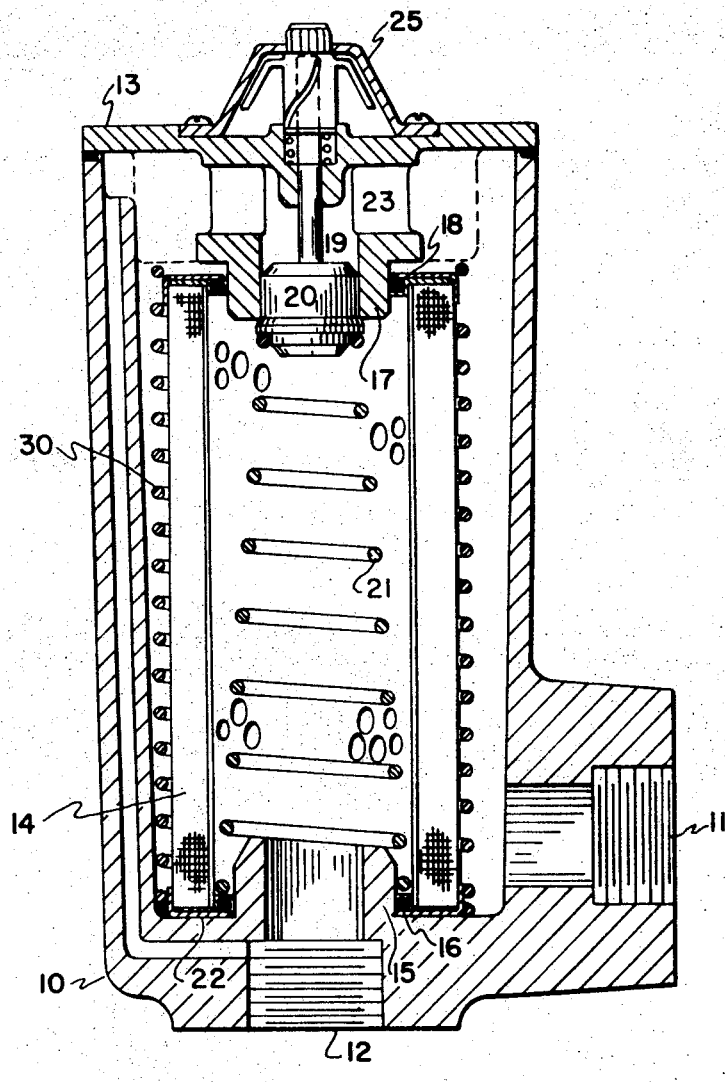
FIG. 1 is a longitudinal sectional view of a filter embodying the invention.

Referring to FIG. 1, a filter embodying the invention comprises a generally cylindrical housing 10 having a radial inlet 11 and an axial outlet 12. The housing includes a removable cover 13 that closes one end thereof opposite the axial outlet 12.

A cylindrical filter element 14 is positioned within the housing and has one end thereof sealingly engaging an axial projection 15 with an O-ring 16 forming the seal.

The other end of the filter element 14 is identical in construction and forms a seal with an axial projection 17 on the cover with an O-ring 18 again forming the actual seal.

The projection 17 includes an opening 19 in which a bypass valve 20 is positioned. The bypass valve 20 is yieldingly urged outwardly and upwardly as viewed in FIG. 1 by a helical spring 21 that is interposed between the valve 20 and the other end of the filter element, the spring serving the additional function of maintaining the filter element against the shoulder 22 of the filter. Axial projection 17 includes radial openings 23 that provide fluid communication between the inlet 11 and the other end of the bypass valve 20.

When the filter 14 becomes dirty, the bypass valve 20 will move axially inwardly and eventually open permitting fluid to be bypassed directly to the outlet 12. Indicating means 25 are provided on the cover 13 to indicate the fact that the filter is dirty and that the bypass valve has moved. Specifically, indicating means forms no part of the present invention.

Figure 2:
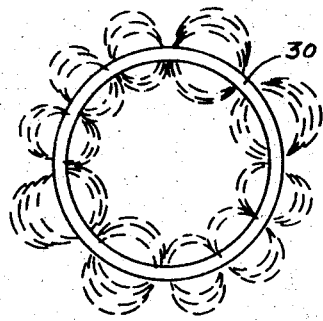
FIG. 2 is a diagrammatic view of the method of operation.

A spring 30 surrounds the filter element and is interposed between the cover and the housing. As shown diagrammatically in FIG. 2, the spring 30 is magnetized in successive north-south poles along its length in order to collect ferrous metal particles in the fluid which might tend to pass through the filter.

The spring 30 is preferably made of a readily magnetizable material such as Cunife I which has a composition of 60 percent copper, 20 percent nickel and 20 percent iron. This material is ductile and can be cold worked to form the spring. In addition it can be readily permanently magnetized so that the resultant magnetized spring has strong magnetic properties.

Although the spring 30 has been shown in helical form, the wire material can be formed in undulating form comprising generally vertical legs connected by loops to produce a one-piece generally cylindrical element which surrounds the filter element.

In addition, the spring 21 is also preferably magnetized and functions to collect ferrous particles when the bypass valve has moved to permit fluid to be bypassed.

In accordance with the invention, spring 30 is magnetized utilizing the apparatus shown in FIGS. 3 and 4. The spring is placed on a core 36 interposed between jaws 31a, 31b and the jaws are caused to clamp the spring. Jaws 31a, 31b contact spaced peripheral portions of the spring. Each jaw 31 forms one pole of a magnetic coil 33 that is energized from a DC power supply 34. The jaw or pole piece 31b is movable by a screw 35 to accommodate insertion and removal of the spring. When in position for magnetization, the coil rests on a plate 37 of non-magnetic material.

In the form of the invention shown in FIG. 5, jaws 31' have a plurality of spaced contact portions such that a greater number of north-south poles are provided along the length of the spring 30.

The apparatus shown can also be utilized for magnetizing other forms of magnetic element such as the sinuous type described above.

We claim:

1. The method of forming a magnetized helical coil of wire which has a plurality of alternating north and south poles along its entire length which comprises placing a helical coil having a plurality of convolutions on a core with adjacent convolutions of said helical coil spaced from one another, engaging a first pole of a DC coil with the exposed radial sides of the convolutions of said helical coil at a first set of longitudinally spaced points along the length of the helical coil, engaging a second pole of said DC coil with the exposed radial sides of the convolutions of said helical coil at a second set of longitudinally spaced points along the length of said helical coil, applying a force to said first and second poles to clamp said convolutions of said helical coil between said core and each of said poles, and applying a DC voltage across said poles to produce a magnetic field.

2. The method set forth in claim 1 wherein said first and second sets of points each comprises at least one row extending axially of said helical coil.

3. The method set forth in claim 1 wherein said first and second sets of points each comprise at least two circumferentially spaced rows extending axially of said helical coil.

* * * * *